United States Patent [19]
Whalen

[11] Patent Number: 5,830,992
[45] Date of Patent: Nov. 3, 1998

[54] LIGHT COLOR, COLOR STABLE ROSIN ESTERS AND METHODS FOR PREPARING SAME

[75] Inventor: David Mayo Whalen, Yardley, Pa.

[73] Assignee: Union Camp Corporation, Wayne, N.J.

[21] Appl. No.: 764,783

[22] Filed: Dec. 12, 1996

[51] Int. Cl.$^6$ .................. C09F 1/00; C09F 1/02; C09F 1/04; C09F 7/00

[52] U.S. Cl. ................ 530/215; 530/210; 530/211; 530/212; 530/213; 530/216; 530/217; 530/218; 530/219; 530/230; 530/232; 530/233

[58] Field of Search ................ 530/210, 211, 530/212, 213, 215, 216, 217, 218, 219, 230, 232, 233

[56] References Cited

U.S. PATENT DOCUMENTS

| | | | |
|---|---|---|---|
| 1,696,337 | 12/1928 | Symmes . | |
| 2,536,661 | 1/1951 | Rheineck . | |
| 2,729,660 | 1/1956 | Harrison . | |
| 3,377,334 | 4/1968 | McBride et al. . | |
| 3,417,071 | 12/1968 | Wheelus . | |
| 3,423,389 | 1/1969 | Wheelus . | |
| 3,780,013 | 12/1973 | Smith . | |
| 4,172,070 | 10/1979 | Scharrer et al. . | |
| 4,548,746 | 10/1985 | Duncan et al. . | |
| 4,643,848 | 2/1987 | Thomas et al. . | |
| 4,650,607 | 3/1987 | Lampo et al. . | |
| 4,659,514 | 4/1987 | Beuke | 260/104 |
| 4,725,384 | 2/1988 | Du Vernet . | |
| 4,758,379 | 7/1988 | Johnson, Jr. . | |
| 4,775,497 | 10/1988 | Pastor et al. . | |
| 4,962,186 | 10/1990 | Johnson, Jr. | 530/218 |
| 5,049,652 | 9/1991 | Minn | 530/213 |
| 5,162,496 | 11/1992 | Johnson, Jr. | 530/212 |
| 5,177,133 | 1/1993 | Peck et al. | 524/139 |
| 5,387,669 | 2/1995 | Maeda et al. | 530/216 |
| 5,504,152 | 4/1996 | Schluenz et al. | 525/54.4 |

*Primary Examiner*—Nathan M. Nutter
*Attorney, Agent, or Firm*—Seed and Berry LLP

[57] ABSTRACT

Rosin esters that are both light colored and color stable are produced by reacting polyhydric alcohol with an equivalent excess of rosin, in the presence of calcium bis(monoethyl (3,5-di-tert-butyl-4-hydroxybenzyl)phosphonate. When phosphinic acid is added to the reaction mixture, light colored and color stable rosin esters are produced regardless of whether the rosin or polyol are in equivalent excess, although preferably the rosin is in equivalent excess. It is preferred to include a phenol sulfide compound, such as Vultac® 2, with the calcium bis(monoethyl(3,5-di-tert-butyl-4-hydroxybenzyl)phosphonate, and to add the phosphinic acid incrementally after the acid number of the rosin and polyhydric alcohol reaction mixture has dropped to about 100. Excess rosin is preferably stripped from the product mixture at about 275° C.

32 Claims, No Drawings

LIGHT COLOR, COLOR STABLE ROSIN ESTERS AND METHODS FOR PREPARING SAME

FIELD OF THE INVENTION

This invention relates to an improved process for preparing light color, color stable rosin esters and to the rosin esters produced by the improved process.

BACKGROUND OF THE INVENTION

Rosin esters of polyhydric alcohols (rosin polyol esters) have been known for well over 50 years. See, e.g., U.S. Pat. No. 1,820,265 to Bent et al. They are typically formed by the reaction of rosin, which is primarily a mixture of isomeric $C_{20}$ tricyclic mono-carboxylic acids known as resin acids, with polyhydric alcohols such as pentaerythritol. These rosin esters currently find commercial use as tackifiers for hot-melt adhesives and pressure-sensitive adhesives, among other uses.

The marketplace places a premium on rosin polyol esters that are light in color. Where the rosin polyol esters will be used in hot melt adhesives, the esters should additionally maintain a light color upon exposure to elevated temperature for extended periods of time. Furthermore, the adhesive utilizing these esters must have good viscosity stability at elevated temperature, and exhibit little or no skinning while at the elevated temperature. Providing this balance of properties, with esters made from rosin, has proven to be a significant challenge.

While it is possible to go through elaborate purification and isomerization processes to obtain practically colorless rosin esters, as disclosed in, e.g., U.S. Pat. Nos. 5,387,669 and 4,962,186, such processes are extremely expensive, and despite the desirability of such a rosin ester, consumers are reluctant to pay the very high prices of the products incorporating rosin esters prepared by such processes. Thus, the prior art contains many disclosures of processes using specific reaction conditions, catalysts, oxidation stabilizers, etc., for the preparation of rosin esters from standard grades of rosin. However, these prior art processes using standard grades of rosin are deficient in providing the desired balance of properties, and particularly a light colored, color stable product, useful in, for example tackifiers for hot melt adhesives.

U.S. Pat. No. 5,177,133 discloses using trimethylolpropane or trimethylolethane, rather than glycerol or pentaerythritol, as the polyol reactant in a rosin esterification, in combination with a phosphorous compound such as phosphinic acid or, more preferably, calcium bis-monoethyl(3,5-di-tert-butyl-4-hydroxybenzyl) phosphonate (e.g., Irganox® 1425). The '133 patent does not suggest that it is advantageous to use a combination of phosphorous compounds in a rosin esterification reaction. Other patents that disclose using phosphinic acid in an esterification reaction include U.S. Pat. No. 5,504,152, 4,725,384, 4,650,607, 4,643,848 and 4,548,746.

U.S. Pat. No. 4,758,379 suggests using an equivalent excess of rosin, compared to the equivalents of polyol, in a rosin esterification reaction. The '379 patent states that the use of excess rosin greatly shortens the reaction time required to make a polyol ester of rosin, and creates a unique product distribution of rosin esters. The '379 patent does not suggest that lighter colored products, or products having improved color stability, result when excess equivalents of rosin are used in an esterification reaction. In fact, in U.S. Pat. No. 4,788,009, the same inventor of the '379 patent states that it is preferred to use an equivalent excess of polyol when preparing rosin esters using certain disclosed phosphorous catalysts.

U.S. Pat. No. 4,659,514 discloses using calcium bis-monoethyl(3,5-di-tert-butyl-4-hydroxybenzyl) phosphonate as a catalyst for preparing rosin esters, in instances where at least one equivalent of polyol is present for each equivalent of rosin. The '514 patent does not suggest to combine the phosphonate salt with any other catalyst or adjuvant, does not provide any data showing the extent to which lighter colored rosin esters may be formed by using a phosphonate salt, and discloses to use an equivalent excess of polyol rather than an equivalent excess of rosin. Another patent that discloses using a phosphosphonate salt (such as Irganox® 1425) in a rosin esterification reaction is U.S. Pat. No. 5,049,652.

The large number of prior art references describing the esterification of rosin with a polyol is a reflection of the need in the art for improvements in methods of preparation and for rosin esters of improved properties. In general, the prior art is directed to making improvements in one or two of the properties of a rosin ester, and fails to disclose how to prepare a rosin ester having a superior balance of properties as needed in, e.g., hot-melt adhesives. The present invention provides this and related advantages as described herein.

SUMMARY OF THE INVENTION

The present invention provides a process for preparing a rosin ester. The process comprises reacting an equivalent excess proportion of rosin with a polyhydric alcohol in the presence of a metal salt of a hindered mono- or diphenylphosphonate, for example, calcium bis-monoethyl (3,5-di-tert-butyl-4-hydroxybenzyl)phosphonate. Preferably, the equivalent excess is about 5% to about 30% equivalent excess of rosin. The metal phosphonate salt is preferably added to the reaction mixture in an amount of about 0.1 wt % to about 0.5 wt % based on the total weight of rosin and polyhydric alcohol.

The esterification reaction is preferably conducted in the presence of phosphinic acid and/or other organic phosphite, which is added to the esterifying reaction mixture in an amount of about 0.1 wt % to about 0.5 wt % based on the total weight of rosin and polyhydric alcohol. The esterification may also be run in the presence of a phenol sulfide compound of the formula

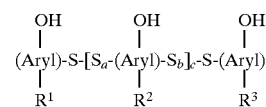

where the Aryl group can be phenyl or naphthyl, $R^1$, $R^2$ and $R^3$ can be the same or different and are hydrocarbon groups, where a and b are independently 0, 1 or 2, and where c is an integer between 0 and 20. The phenol sulfide compound is added to the reaction mixture in an amount of about 0.05 wt % to about 0.5 wt % based on the total weight of rosin and polyhydric alcohol.

In a preferred process, the rosin and the polyhydric alcohol are reacted to form a product mixture comprising polyol ester of rosin having an acid number of about 20 to about 50, and then excess rosin is stripped from the product mixture so the final product mixture has an acid number of about 0 to 25, preferably less than about 15, and more preferably has an acid number of about 5 to about 15.

Another aspect of the invention is a process for preparing a rosin ester which comprises reacting rosin with a polyhydric alcohol in the presence of phosphinic acid and calcium bis-monoethyl(3,5-di-tert-butyl-4-hydroxybenzyl) phosphonate. Preferably, the polyhydric alcohol is pentaerythritol. The polyhydric alcohol is preferably reacted with an equivalent excess of rosin.

The invention also includes the rosin ester products of the above processes. These esters have an acid number of less than about 25, preferably less than about 15, and more preferably about 5 to about 15. They preferably have a Gardner color of less than or equal to 4, and more preferably have a Gardner color of less than or equal to 3. Furthermore, they preferably have a softening point of about 95° C. to about 120° C.

Such rosin esters may display an excellent balance of properties, where important properties for a hot-melt tackifier include light color, color stability over time, especially at elevated temperature, little or no skinning of the adhesive and little or no change in adhesive viscosity at elevated temperature.

DESCRIPTION OF THE PREFERRED EMBODIMENTS

As indicated above, the invention is directed to preparing esters from rosin and polyhydric alcohols. Rosin is mainly a mixture of $C_{20}$, tricyclic fused-ring, monocarboxylic acids, typified by pimaric and abietic acids, which are commonly referred to as resin acids. Rosin can be obtained from many sources, and can have a wide range of purities. For example, wood rosin may be employed in the invention, where wood rosin is obtained from Pinus stumps after harvesting the stumps, chipping the stumps into small chips, extracting the chips with hexane or higher-boiling paraffins, and distilling the hexane or paraffin and fatty acids to yield wood rosin. Gum rosin, which is the name given to rosin that is obtained after scoring a pine tree, collecting the exudate sap, and then distilling away the volatile components and most of the fatty acids, may also be employed in the invention.

Preferably, the rosin is tall oil rosin, which is a byproduct of the kraft, i.e., sulfate, pulping process for making paper. According to this process, pinewood is digested with alkali and sulfide, producing tall oil soap and crude sulfate turpentine as by-products. Acidification of this soap followed by fractionation of the crude tall oil yields tall oil rosin and fatty acids. Any one or more of the $C_{20}$ tricyclic monocarboxylic acid isomers present in rosin may be used in the invention.

Rosin is typically characterized by its acid number, and rosins having acid numbers ranging from about 160 to about 180 are preferred according to the invention. Preferably, the tall oil rosin has undergone distillation so as to have less than about 5 weight percent tall oil fatty acids. A preferred rosin is available commercially from Union Camp Corporation, Wayne, N.J., under the Unitol® trademark.

Prior or subsequent to preparing an ester of the present invention, the rosin (or rosin residue in the ester) may be subjected to one or more treatments such as crystallization, disproportionation, hydrogenation, mild polymerization, formaldehyde modification, modification with unsaturated mono-acids or diacids such as acrylic acid, fumaric acid and maleic anhydride and the like, or to some combination of these treatments. Also, after performing any of the above treatments on the rosin, the rosin may be subjected to distillation, to provide a distillative fraction that is suitably employed in the invention. Such treatments can be used, for example, to modify the melt point of the resulting rosin ester of the present invention. Such treatments are known to those skilled in the art.

The polyhydric alcohols, which are commonly referred to as polyols, that may be employed in the esterification of the invention are also well known and are represented by diols such as ethylene glycol, propylene glycol, diethylene glycol, triethylene glycol, tetraethylene glycol, trimethylene glycol; triols such as glycerol, trimethylolpropane and trimethylolethane; tetraols such as pentaerythritol; and hexols such as mannitol.

Pentaerythritol is a preferred polyhydric alcohol. Commercially available pentaerythritol is the product mixture formed by the condensation of acetaldehyde and formaldehyde. Thus, pentaerythritol is commonly a mixture of the monomeric form, i.e., $C(CH_2OH)_4$, as well as the dimeric form $(CH_2OH)_3C—CH_2OCH_2—C(CH_2OH)_3$, and higher oligomers. The "pure grade" of pentaerythitol consists of 98 or greater weight percent of the monomeric form of pentaerythritol, i.e., is mono-pentaerythritol. The technical grade consists of about 86 to 90 weight percent of the monomeric form, a maximum of 12 weight percent of the dipentaerythritol form, a maximum of 3 weight percent of the tripentaerythritol form and a maximum of 2 weight percent of the pentaerythritol linear form. Either one or both of the technical grade or the mono-pentaerythritol may be used in the invention. A preferred pentaerythritol is available from Hercules Incorporated, Wilmington, Del.

A. Preparation of Rosin Polyol Ester Using Excess Equivalents of Rosin and a Metal Salt of a Hindered Phenylphosphonate or Diphenylphosphonate In a general process to prepare rosin esters according to the invention, rosin is charged to a reaction vessel under an inert, i.e., non-oxidizing atmosphere, typically nitrogen, and heated to a temperature of about 160° C.–195° C. Since the rosin ester desirably has a light color, and color is sensitive to oxygen exposure, the reaction is preferably conducted under an inert atmosphere to minimize such oxygen exposure.

A small amount of a metal salt, such as a calcium or magnesium salt, of a hindered phenylphosphonate or diphenylphosphonate (hereinafter "phosphonate salt") is added to the molten rosin. These phosphonates are described in U.S. Pat. No. 3,310,575. A preferred phosphonate salt is calcium bis-monoethyl(3,5-di-tert-butyl-4-hydroxybenzyl) phosphonate, commercially available from Ciba-Geigy, Hawthorne, N.Y., as Irganox® 1425. Approximately 0.1 wt % to about 0.5 wt %, and preferably about 0.15 wt % to about 0.25 wt % of phosphonate salt is added to the rosin, where the wt % values here and throughout this disclosure are based on the combined weight of rosin and polyhydric alcohol added to the reaction vessel.

Either before, simultaneous with, or soon after adding the phosphonate salt to the rosin, a phenol sulfide compound is also added to the rosin. A preferred phenol sulfide compound has the formula

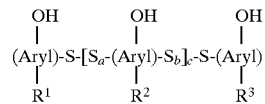

where the Aryl group can be phenyl or naphthyl, $R^1$, $R^2$ and $R^3$ can be the same or different and are hydrocarbon (also known as hydrocarbyl) groups, where "a" and "b" are independently 0, 1 or 2, and where "c" is an integer between 0 and 20. A preferred phenol sulfide compound is an amylphenol disulfide polymer, where such a polymer is available from Elf Atochem North America, Inc., Philadelphia, Pa., as Vultac® 2. Preferably, about 0.05 wt % to about 0.5 wt % of amylphenol disulfide polymer is used in the preparation of the rosin esters of the invention. Preferably, the phenol sulfide compound is added to the molten rosin prior to beginning the esterification reaction, although it can be added at a later stage. The phenol sulfide compound is believed to afford oxidative stability to the rosin ester, as well as some bleaching during formation of the rosin ester.

Also added to the molten rosin is the polyhydric alcohol. The amount of polyhydric alcohol should be such that rosin is present in equivalent excess of the polyhydric alcohol. In other words, the product mixture should contain more acid groups from rosin than hydroxyl groups from polyhydric alcohol, where a mole of acid or hydroxyl groups is an "equivalent" of such a group, and a 5 equivalent percent excess of rosin means that there are 1.05 moles of acid groups from rosin for every 1.0 moles of hydroxyl groups from the polyhydric alcohol, present in the reaction mixture. Preferably, rosin is present in about 5 to about 30 equivalent percent excess compared to polyhydric alcohol, and more preferably the rosin is present in about 5 to about 15 equivalent percent excess. It has been surprisingly found that by employing an equivalent excess of rosin, a lighter colored rosin ester product is formed than when the polyhydric alcohol is in equivalent excess, or when equal equivalents of rosin and polyhydric alcohol are used.

The ability of an equivalent excess of rosin to provide lighter colored rosin esters is particularly surprising in view of the use of a phosphonate salt, such as calcium bis-monoethyl(3,5-di-tert-butyl-4-hydroxybenzyl)phosphonate, in the initial stages of the esterification reaction. Heretofore, phosphonate salts have been used in rosin esterification reactions only when polyhydric alcohol was in equivalent excess of the rosin, or when rosin and polyhydric alcohol were present in equal equivalent amounts.

It has been surprisingly found that desirably light colored rosin esters can be obtained when the esterification is run using an equivalent excess of rosin and in the presence of phosphonate salt, e.g., calcium bis-monoethyl(3,5-di-tert-butyl-4-hydroxybenzyl)phosphonate. The rosin esters so formed will have good color stability at elevated temperature, and hot melt adhesives made from them will have good viscosity stability with little or no skinning. Additionally, the softening points of these esters are desirably higher than would otherwise be observed. Higher softening point can lead to less migration of the tackifier, and to an adhesive exhibiting better strength and more creep resistance, which are all desirable performance properties.

According to a preferred process of the invention, a reaction mixture comprising rosin, polyhydric alcohol, calcium bis-monoethyl(3,5-di-tert-butyl-4-hydroxybenzyl) phosphonate and preferably Vultac® 2 is heated to a temperature of 250° C. to 280° C. The rosin esterification reaction is allowed to proceed until the acid number of the mixture reaches 20 to 50, and preferably reaches an acid number of about 25. Techniques to measure acid numbers are well known in the art and need not be described here. See, e.g., ASTM D-465 (1982).

Once the acid number of the product mixture has reached about 50, preferably about 25, then the reaction vessel is vacuum evacuated to a pressure of about 10–50 mbar at a preferred temperature of 275° C. or slightly above, while injecting an inert gas, preferably steam or nitrogen, into the molten rosin ester. These "stripping" conditions are maintained until the acid number of the product mixture reaches the desired target, which for rosin esters to be used as tackifiers, is less than about 25, preferably less than about 15, and more preferably about 5–15. The use of vacuum, nitrogen or steam sparging and a temperature of about 275° C. or higher provides for the removal of volatile rosin materials, such as decarboxylated rosin. These volatile materials are desirably removed so as to achieve the target softening point for the resin, and also because they tend to adversely affect the color and color stability of the rosin ester product.

After the target acid number of the product mixture has been reached, or nearly been reached, it is preferred to add some stabilizers to the rosin ester. These stabilizers help retard coloration that can develop in the rosin esters during their storage and use, and include antioxidants and UV-stabilizers. The one or more stabilizers are preferably, in total, added to the rosin ester at a concentration of about 0.15 wt % to about 0.50 wt %. A preferred package is composed of a combination of Ultranox® 257 and/or Ultranox® 236 from GE Specialty Chemicals, Parkersburg, W. Va.; Irganox® 565, Irganox® 1010 and/or Irganox® 1520 from Ciba-Geigy Corporation; and may contain Weston® 618 from GE Specialty Chemicals, Morgantown, W. Va. Other stabilizers which are known in the art, such as zinc acetate, may instead, or additionally, be present in the stabilizer package, although zinc acetate is not a preferred stabilizer.

A rosin ester according to the preferred process of the invention has an acid number of less than about 25, preferably less than about 15, and more preferably of about 5 to about 15; a Gardner color of less than or equal to 4, preferably less than or equal to 3; a softening point of about 95° C. to about 120° C.; and does not show large changes in color when subjected to elevated temperature over extended periods of time. Color stability during storage may be measured by an accelerated aging test wherein a ground sample of rosin ester is held at 45° C. for one week in an open tray exposed to air flow, and the sample is thereafter exposed to 176° C. in a covered test tube for 96 hours. Ester color is measured every 24 hours. An increase of 4 or less Gardner units is considered within an acceptable range. A rosin ester according to the inventive process will show little or no skinning when mixed with, e.g., Petrolite BE Square 185® and Elvax® 250, and heat aged at 176° C. for 96 hours.

B. Preparation of Rosin Polyol Ester Using Phosphinic Acid and Phosphonate Salt as Combined Catalyst According to a preferred process, rosin is charged to a reaction vessel under an inert, i.e., non-oxidizing atmosphere, typically nitrogen, and heated to a temperature of about 140° C.–170° C. Then a small amount of phosphonate salt as defined above, and preferably calcium bis-monoethyl(3,5-di-tert-butyl-4-hydroxybenzyl)phosphonate, is added to the molten rosin. The preferred phosphonate salt is Irganox® 1425. Approximately 0.1 wt % to about 0.5 wt %, and preferably about 0.15 wt % to about 0.25 wt % of phosphonate salt is added to the rosin.

Either before, simultaneous with, or soon after adding the phosphonate salt to the rosin, a phenol sulfide compound is also added to the rosin. Preferably, the phenol sulfide compound is added immediately before addition of the phosphonate salt, and the phenol sulfide compound has the formula given above. A preferred phenol sulfide compound is amylphenol disulfide polymer (e.g., Vultac® 2 as described above), and is added to the reaction mixture in an amount of about 0.05 wt % to about 0.5 wt % (based on the total weight of rosin and polyhydric alcohol). Next added to the molten rosin is the polyhydric alcohol.

Phosphinic acid and/or an aryl phosphite can be added to the esterification reaction mixture in order to help reduce the ester color. An example of the arylphosphite is tris (nonylphenyl)phosphite. For cost considerations, phosphinic acid (also referred to as hypophosphorous acid) is preferred. One or more of these materials may be added either before, simultaneous with, or after, adding the phenol sulfide compound to the reaction mixture. It is preferred to add the phosphinic acid incrementally after the acid number of the rosin and polyhydric alcohol reaction mixture has dropped to about 100.

The combination of phosphinic acid and phosphonate salt may be used regardless of whether the rosin or the polyhydric alcohol is in equivalent excess, or indeed even when the equivalents of rosin equals the equivalents of polyhydric alcohol. However, it is preferred to use excess equivalents of rosin, and particularly about 5% to about 30% equivalent percent excess of rosin, in preparing the rosin polyol ester according to the invention.

According to a preferred process of the invention, a reaction mixture comprising 10% equivalent excess of rosin, polyhydric alcohol, calcium bis-monoethyl(3,5-di-tert-butyl-4-hydroxybenzyl)phosphonate and amyphenol disulfide polymer (e.g., Vultac® 2) is heated to about 270° C. and then maintained at that temperature to form a product mixture having an acid number of about 100. At this point, the phosphinic acid is added to the mixture.

Phosphinic acid addition to the forming rosin ester is preferably done incrementally. That is, it may be added dropwise, or in small portions (sometimes referred to as "shots"), over several hours. According to a particularly preferred embodiment, the phosphinic acid is divided into three portions of approximately equal amount, and these portions are added to the molten rosin in about one-hour intervals.

After addition of the phosphinic acid, the rosin esterification reaction is allowed to proceed until the acid number of the product mixture reaches about 20 to 50. Then the reaction vessel is placed under vacuum to a pressure of about 10–50 mbar, while injecting an inert gas, preferably nitrogen or steam, into the molten rosin ester. These "stripping" conditions are maintained until the acid number reaches the desired target, which for rosin esters to be used as tackifiers, is about 5 to 15.

After the acid number of the product mixture has reached, or about reached the desired target, it is preferred to add some stabilizers to the rosin ester. These stabilizers help retard coloration that can develop in the rosin esters during their storage and use, and include antioxidants and UV-stabilizers. The one or more stabilizers are preferably, in total, added to the rosin ester at a concentration of about 0.15 wt % to about 0.50 wt %. A preferred package is composed of a combination of Ultranox® 257 and/or Ultranox® 236 from GE Specialty Chemicals, Parkersburg, W. Va.; Irganox® 565, Irganox® 1010 and/or Irganox® 1520 from Ciba-Geigy Corporation; and may contain Weston® 618 from GE Specialty Chemicals, Morgantown, W. Va. Other stabilizers which are known in the art, such as zinc acetate, may instead, or additionally, be present in the stabilizer package, although zinc acetate is not a preferred stabilizer.

A rosin ester according to the preferred process of the invention has an acid number of about less than about 25, preferably about 5 to about 15, a Gardner color of less than or equal to 4, preferably less than or equal to 3, a softening point of about 95° C. to about 120° C., changes only slightly in color at elevated temperature over extended periods of time, and displays no skinning when formulated into a hot-melt adhesive formulation and maintained at an elevated temperature.

A preferred composition of the invention is the reaction product of about 89.6 parts HYR rosin with about 8.8 parts mono-pentaerythritol, where about 0.9 parts 50% Vultac® 2 in toluene, about 0.2 parts 50% phosphinic acid in water and about 0.2 parts Irganox® 1425 have been added to the reaction mixture.

The process of the present invention provides esters of rosin having improved, lighter colors and improved color stability, with a minimum of labor and cost. The rosin esters of the invention are thus well-suited for use as tackifiers and in other applications where light-colored rosin esters are needed or desired. The rosin esters of the invention are particularly well suited for hot-melt adhesive tackifiers, because they display good color stability at elevated temperature, with little or no adhesive skinning, and little or no change in adhesive viscosity. Thus, rosin esters according to the invention have an excellent balance of properties, making them well-suited to various commercial applications including hot-melt adhesives.

The invention will now be illustrated in more detail by the following non-limiting examples, which demonstrate the advantageous properties of the present invention. Parts and percentages are by weight unless indicated otherwise.

Unitol® rosin (CAS # 8050-09-7), also called HYR rosin, was from Union Camp Corporation, Wayne, N.J. and had an acid number of 176.9 and a softening point of 83.8° C. Vultac® 2(CAS # 68555-986), which is an amylphenol disulfide polymer, obtained from Elf Atochem North America, Inc., Philadelphia, Pa., was used as a 50% solution intoluene. This same phenol sulfide may be used as a solution in other solvents, or may be used neat. Phosphonic acid, also known as hypophosphorous acid, $H_3PO_2$, was obtained as a 50 wt % solution in water (CAS # 6303-21-5) from Rhone-Poulenc Basic Chemicals Co., Shelton, Conn. Monopentaerythritol, which is pentaerythritol (CAS # 115-77-5) having a monomeric pentaerythritol ($C(CH_2OH)_4$) content of at least 98%, was obtained from Hercules Incorporated, Wilmington, Del. Irganox® 1425 catalyst (CAS # 65140-91-2), which is calcium bis(monoethyl(3,5-di-tert-butyl-4-hydroxybenzyl)phosphonate), and stabilizer packages made up of combinations or individuals of the following: Irganox® 565 (CAS # 991-84-4), which is 4-( (4,6-bis(octylthio)-s-triazin-2-yl)amino-2,6-di-tert-butylphenol, Irganox® 1010 (CAS 6683-19-8) which is tetrakis (methylene(3,5-di-tert-butyl-4-hydroxyhydrocinnamate)methal or Irganox® 1520 (CAS 110553-27-0) which is 2-methyl-4,6-bis{(octylthio) methyl}phenol were obtained from Ciba-Geigy Corporation, Hawthorne, N.Y. Ultranox® 257, which is the reaction products of 4-methylphenol with dicyclopentadiene and isobutylene (CAS # 68610-51-5) and Ultranox® 236 (CAS 96-69-5) which is 4,4'-thio-bis-(2-tertiart-butyl-5-methylphenol were obtained from GE Specialty Chemicals, Parkersburg, W. Va. Weston® 618 stabilizer, which is distearyl pentaerythritol diphosphite (CAS # 3806-34-6) was obtained from GE Specialty Chemicals, Morgantown, W. Va.

Softening points were measured with a Mettler FP80 Central Processor and a Mettler FP83 HT Dropping point cell with a softening point ring, and are reported in the following TABLES in degrees centigrade. Gardner colors were measured instrumentally with a Milton Roy Spectronic 301 unit with the data being converted to Gardner units using a Gardner Color Measurement by Tristimulus program on a personal computer.

EXAMPLES

Example 1

(COMPARATIVE)

This reaction was run as stated in Example 6 of U.S. Pat. No. 4,650,607.

In a suitable reaction vessel, HYR rosin (acid number 176.6, Gardner color about 5) was melted under a nitrogen blanket after vacuum evacuation. The rosin was heated to 200° C. and 20% equivalent excess of mono-pentaerythritol, 0.18% of 50% $H_3PO_2$, and 0.56% of 50% Vultac® 2 in toluene were added successively. The reaction temperature was then raised to 250° C. About 3 hour after reaching 250° C., the reaction temperature of the mixture was increased to 275° C. The reaction was held at 275° C. until an acid number of <15 was reached (this required about 9.5 hours, with the reaction mixture maintained overnight at 150° C. within this 9.5 hour period).

The Gardner color of the product was measured at 4+, with a softening point of 86.3° C., and acid number of 13.4. The aging properties of this rosin ester were measured, and the results are set forth in TABLE A.

Example 2

(COMPARATIVE)

The reaction product of Example 1 was cooled to a temperature of 200° C. and the stabilizer package as used in Examples 3 and 4, was added.

As shown in TABLE A, a comparison of Examples 1 and 2 demonstrates that using a stabilization package will provide a rosin ester with greater color stability. However, the color stability is much poorer than can be obtained according to the inventive process (see, e.g., Example 3).

Example 3

In a suitable nitrogen-blanketed reaction vessel, HYR rosin was charged and the vessel was vacuum evacuated. The rosin was heated to a temperature of 166° C., and then 0.88% of 50% Vultac® 2in toluene, 0.19% of Irganox® 1425 and 8.75% monopentaerythritol were added successively (these weight percentage values being based on 100 parts of HYR rosin). This provided a 10% excess equivalent of rosin. The reaction temperature was then raised to 270° C. and maintained at that temperature for about 8 hours. In one-hour intervals, starting one hour after the reaction temperature reached 270° C., was added a total of 0.21% (in one third aliquots) of 50% phosphinic acid.

After the reaction had been maintained until an acid number of <30 was reached, the temperature was increased to 275° C. The temperature was maintained at 275° C. until an acid number of <25 was reached. Thereafter, volatile components were stripped out of the product mixture under vacuum with nitrogen sparging, until an acid number of <15 was reached.

The reaction temperature was then decreased to 200° C. Then 0.34% of a stabilizer package was added and heating continued at 200° C. for 15 minutes. The final product was analyzed to have an acid number of 13.3, a softening point of 98.4° C. and a Gardner color of 3.

The rosin ester of Example 3 (inventive) had superior (i.e., lower) initial color compared to the rosin ester of Example 1 (comparative) and, as shown in TABLE A, also demonstrated superior color stability compared to the rosin ester of Example 2 (comparative, same composition as Example 1, however containing the stabilizer package also present in the rosin ester of Example 3).

Example 4

In a suitable nitrogen-blanketed reaction vessel, HYR rosin (a 10% equivalent excess, in comparison to pentaerythritol), was charged. The rosin was heated to a temperature of about 180° C., and then 0.89% of 50% Vultac® 2 in toluene, 0.19% of Irganox® 1425 and 8.77% of mono-pentaerythritol were added successively (the percentage values being based on the weight of rosin charged). The reaction temperature was then raised to 270° C. Thereafter, a reaction temperature of 270° C. was maintained until acid number of <30 was reached. The reaction temperature was raised to 275° C. and held there until an acid number of <25 was reached. In this instance, aliquots of phosphinic acid were not added to the reaction mixture, as in Example 3.

Thereafter, the volatile components were stripped out of the product mixture under vacuum with nitrogen sparging, until an acid number of <15 was reached. The reaction temperature was then decreased to 200° C. Then 0.34% of a stabilizer package was added and heating was continued at 200° C. for 15 minutes.

The final product was analyzed to have an acid number of 14.2, a softening point of 98.0° C. and a Gardner color of 4. As shown in TABLE A, the rosin ester had good color stability.

TABLE A

PHYSICAL PROPERTIES OF ROSIN ESTERS

| | Example 1 (comparative) | Example 2 (comparative) | Example 3 (inventive) | Example 4 (inventive) |
| --- | --- | --- | --- | --- |
| Initial Gardner Color non-aged[1a] | 6.0 | 4.7 | 3.1 | 4.0 |
| Final (96 hr) Gardner Color non-aged[1b] | 14.2 | 10.4 | 6.8 | 7.0 |
| Initial Gardner Color aged[2a] | 11.7 | 8.0 | 3.5 | 5.1 |
| Final (96 hr) Gardner Color aged[2b] | 16.2 | 12.7 | 8.1 | 8.7 |
| Softening Point | 86.3° C. | 85.8° C. | 98.4° C. | 98.0° C. |
| Acid Number | 13.4 | 12.8 | 13.3 | 14.2 |

[1a]: Sample remelted @ 176° C. in test tube covered.
[1b]: Sample after 96 hours @ 176° C.
[2a]: Sample ground and held in open air @ 45° C. to age for one week then remelted in covered test tube @ 176° C.
[2b]: Aged @ 45° C. for one week, held in covered test tube @ 176° C. for 96 hours.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for preparing a rosin ester which comprises heating an equivalent excess proportion of rosin with a polyhydric alcohol in the presence of a metal salt of a hindered phenylphosphonate or diphenylphosphonate so as to form a rosin ester.

2. The process of claim 1 wherein the metal salt of a hindered phenylphosphonate or diphenylphosphonate is calcium bis-monoethyl(3,5-di-tert-butyl-4-hydroxybenzyl) phosphonate.

3. The process of any one of claims 1 or 2 wherein the equivalent excess is about 5% to about 30% equivalent excess of rosin, based on hydroxyl equivalents from the polyhydric alcohol.

4. The process of any one of claims 1 or 2 wherein the rosin is selected from the group consisting of tall oil rosin, gum rosin and wood rosin, disproportionated tall, gum or wood rosin, hydrogenated tall, gum or wood rosin, polymerized tall, gum or wood rosin, formaldehyde treated tall, gum or wood rosin, unsaturated mono-acid reaction products of tall, gum or wood rosin, and distillative fractions of tall, gum or wood rosin.

5. The process of any one of claims 1 or 2 wherein the polyhydric alcohol is selected from the group consisting of ethylene glycol, propylene glycol, diethylene glycol, triethylene glycol, tetraethylene glycol, trimethylene glycol, glycerol, trimethylolpropane, trimethylolethane, pentaerythritol and mannitol.

6. The process of any one of claims 1 or 2 wherein the polyhydric alcohol is pentaerythritol.

7. The process of any one of claims 1 or 2 wherein the metal salt of a hindered phenylphosphonate or diphenylphosphonate is added to the rosin in an amount of about 0.1 wt % to about 0.5 wt % based on the total weight of rosin and polyhydric alcohol.

8. The process of any one of claims 1 or 2 wherein phosphinic acid is added to the reaction mixture.

9. The process of claim 8 wherein phosphinic acid is added to the reaction mixture in an amount of about 0.01 wt % to about 0.5 wt % based on the total weight of rosin and polyhydric alcohol.

10. The process of any one of claims 1 or 2 wherein a phenol sulfide compound is added to the reaction mixture, and the phenol sulfide compound is of the formula

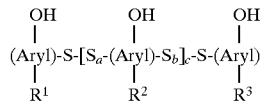

where the Aryl group can be phenyl or naphthyl, $R^1$, $R^2$ and $R^3$ can be the same or different and are hydrocarbon groups, where a and b are independently 0, 1 or 2, and where c is an integer between 0 and 20.

11. The process of claim 10 wherein the phenol sulfide compound is added in an amount of about 0.05 wt % to about 0.5 wt % based on the total weight of rosin and polyhydric alcohol.

12. The process of any one of claims 1 or 2, further comprising reacting the rosin and the polyhydric alcohol to form a product mixture comprising polyol ester of rosin having an acid number of about 20 to about 50, and then stripping out excess rosin so the final product mixture has an acid number of less than about 25.

13. The process of claim 12 wherein the final product mixture has an acid number of less than about 15.

14. The product produced by the process of any one of claims 1 or 2.

15. The product of claim 14 having an acid number of less than about 15.

16. The product of claim 14 having a Gardner color of less than or equal to 4.

17. The product of claim 14 having a Gardner color of less than or equal to 3.

18. A process for preparing a rosin ester which comprises heating a reaction mixture comprising rosin and polyhydric alcohol, and adding to the reaction mixture phosphinic acid and calcium bis-monoethyl(3,5-di-tert-butyl-4-hydroxybenzyl)phosphonate.

19. The process according to claim 18, wherein the reaction mixture comprises an equivalent excess of rosin in comparison to the equivalents of the polyhydric alcohol.

20. The process of claim 19 wherein the equivalent excess is about 5% to about 30% equivalent excess of rosin.

21. The process of claim 18 wherein the rosin is selected from the group consisting of tall oil rosin, gum rosin and wood rosin, disproportionated tall, gum or wood rosin, hydrogenated tall, gum or wood rosin, polymerized tall, gum or wood rosin, formaldehyde treated tall, gum or wood rosin, unsaturated mono-acid reaction products of tall, gum or wood rosin, and distillative fractions of tall, gum or wood rosin.

22. The process of claim 18 wherein the polyhydric alcohol is selected from the group consisting of ethylene glycol, propylene glycol, diethylene glycol, triethylene glycol, tetraethylene glycol, trimethylene glycol, glycerol, trimethylolpropane, trimethylolethane, pentaerythritol and mannitol.

23. The process of claim 18 wherein the polyhydric alcohol is pentaerythritol.

24. The process of claim 18 wherein the calcium bis-monoethyl(3,5-di-tert-butyl-4-hydroxybenzyl)phosphonate is added to the reaction mixture in an amount of about 0.1 wt % to about 0.5 wt % based on the total weight of rosin and polyhydric alcohol.

25. The process of claim 18 wherein the phosphinic acid is added to the reaction mixture in an amount of about 0.1 wt % to about 0.5 wt % based on the total weight of rosin and polyhydric alcohol.

26. The process of claim 18 wherein a phenol sulfide is added to the reaction mixture, and the phenol sulfide compound is of the formula

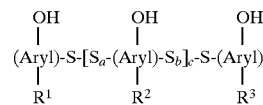

where the Aryl group can be phenyl or naphthyl, $R^1$, $R^2$ and $R^3$ can be the same or different and are hydrocarbon groups, where a and b are independently 0, 1 or 2, and where c is an integer between 0 and 20.

27. The process of claim 26 wherein the phenol sulfide compound is added to the reaction mixture in an amount of about 0.05 wt % to about 0.5 wt % based on the total weight of rosin and polyhydric alcohol.

28. The process of claim 18, further comprising reacting the rosin and the polyhydric alcohol to form a product mixture comprising polyol ester of rosin having an acid number of about 20 to about 50, and then stripping out excess rosin so the final product mixture has an acid number of less than about 25.

29. The product produced by the process of any one of claims 18–28.

30. The product of claim 29 having an acid number of less than about 15.

31. The product of claim 29 having a Gardner color of less than or equal to 3.

32. The product of claim 29 having a softening point of about 95° C. to about 120° C.

* * * * *